H. P. KRAFT & P. W. KAUTZMAN.
LOCK FOR PNEUMATIC TIRE RIMS.
APPLICATION FILED JULY 14, 1910.
1,137,868.
Patented May 4, 1915.
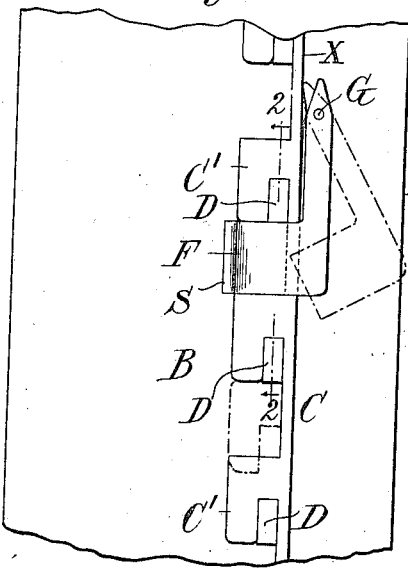
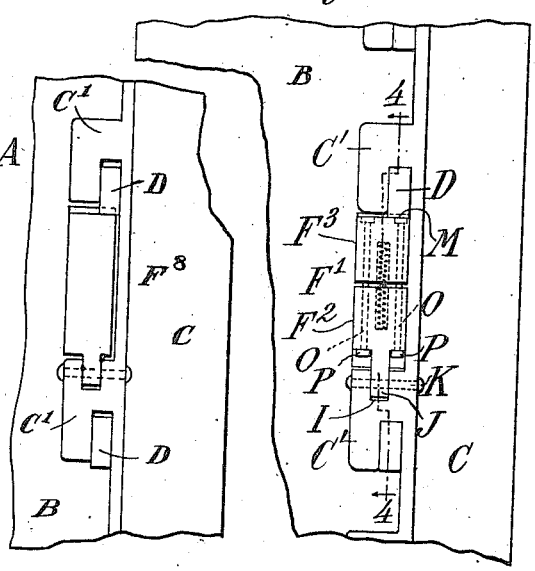
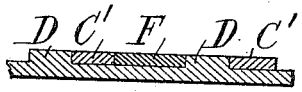
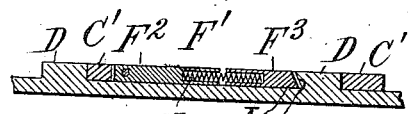
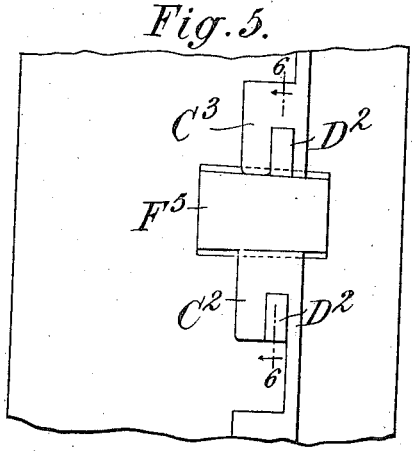
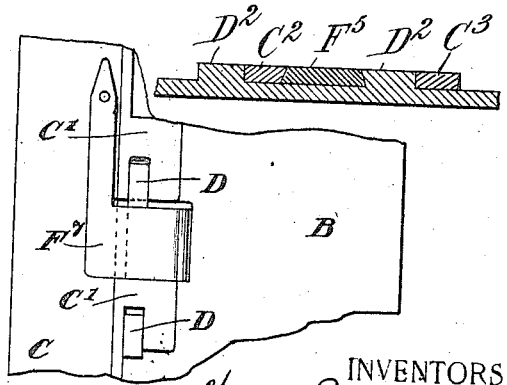
WITNESSES:
INVENTORS:
Henry P. Kraft and
Philip W. Kautzman
By Attorneys,

UNITED STATES PATENT OFFICE.

HENRY P. KRAFT, OF RIDGEWOOD, AND PHILIP W. KAUTZMAN, OF WEST HOBOKEN, NEW JERSEY, ASSIGNORS TO A. SCHRADER'S SON, INCORPORATED, OF BROOKLYN, NEW YORK, A CORPORATION OF NEW YORK.

LOCK FOR PNEUMATIC-TIRE RIMS.

1,137,868.  Specification of Letters Patent.  Patented May 4, 1915.

Application filed July 14, 1910. Serial No. 571,939.

*To all whom it may concern:*

Be it known that we, HENRY P. KRAFT, residing in Ridgewood, in the county of Bergen and State of New Jersey, and PHILIP W. KAUTZMAN, residing in West Hoboken, in the county of Hudson and State of New Jersey, have invented certain new and useful Improvements in Locks for Pneumatic-Tire Rims, of which the following is a specification.

This invention relates to pneumatic tire rims of the type in which the rim is split circumferentially into two sections for the purpose of facilitating the mounting and removal of the tire thereon. In such devices means are provided for preventing lateral separation of the sections when the tire is mounted thereon. It has heretofore been proposed to provide a tire rim of this construction wherein one section is provided with a series of hook-like members which are adapted to engage a series of lugs upon the other section. In this construction the hooks are engaged with the lugs by a relative rotative movement of the two rim sections.

Our invention provides a means for locking such or other analogous sections together so that they cannot separate in use. As applied to the type of rim just described the invention is designed to prevent a relative reverse movement of the rim sections so that the parts cannot become accidentally separated.

The device provided by the invention constitutes a cheap, simple and effective locking means.

In the accompanying drawings wherein we have illustrated several embodiments of the invention,—Figure 1 is an inner view of part of the tire rim showing in plan view one form of lock. Fig. 2 is a section on the line 2—2 in Fig. 1. Fig. 3 is a view similar to Fig. 1 illustrating another form. Fig. 4 is a section on the line 4—4 in Fig. 3. Fig. 5 is a view similar to Fig. 1 of a third form. Fig. 6 is a section on the line 6—6 in Fig. 5. Fig. 7 illustrates a modification of the construction illustrated in Figs. 1 and 2; and Fig. 8 illustrates a modification of the construction illustrated in Figs. 3 and 4.

Referring first to Fig. 1 let A indicate the rim as a whole which is shown as formed in two sections B and C. In this type of rim section C is provided with a series of hook-like members C' C' which are adapted to engage a series of abutments D D on the section B. This engagement takes place when the part C is fitted over the part B with the hooks C' in the dotted line position and the parts given a relative rotative movement.

The present invention provides a means for preventing a reverse rotative movement in order to hold the sections in their engaged positions. According to our invention such means comprise a locking member which preferably fits between one of the abutments D and the rear of one of the hooks C'. In the construction illustrated in Fig. 1 such lock comprises a member F, the rear of which is preferably formed of spring material, and which is pivoted to the section C at G. By lifting the front part it can be moved out of engagement with the hook and abutment, wherefrom it may be swung outwardly until its inclined face engages a bead or ridge X formed on the section C, in which position it is retained by friction. By lifting the front of the lock and turning it to the proper position it may be dropped in place between the lug and lock, in which position it cannot be turned out of engagement unless first lifted. The lock F may be provided with a lip S to facilitate lifting it.

In the construction illustrated in Fig. 3, the lock F' is pivoted to one of the sections of the rim at a plane which is at right angles to the pivot G in Fig. 1. As a convenient means of pivoting the lock to the section C one of the hooks C' is preferably recessed at I, and the lock is provided with a tail-piece J entering the recess, the pin K being passed through both parts. The forward face L of the lock F' is designed to engage a side of one of the abutments D, thus introducing a locking means between such abutment and the rear of the hook C' and preventing relative rotating movement of the rim sections. In this case we prefer to undercut the abutment D at M and to form the forward face L of the lock with a corresponding beveled portion. This might be done if the lock were formed in one piece, in which case it would be only necessary to give the rim sections a slight reverse relative rotation in order that the face L should engage the undercut portion M. We prefer, however, to form the lock in two parts $F^2$, $F^3$, which are normally pressed apart by a spring N, the ends of which are located in opposing recesses formed in the two parts of the lock. In order to connect the two parts of the lock and permit them to slide relatively to each other we provide pins O fastened to one part of the lock and moving in holes or passages in the other part. In the construction shown the pins are fastened to the part $F^3$ and move in passages formed in the part $F^2$. The pins are headed as shown at P to limit the movement of the part $F^3$.

In operation after the rim sections are in place the part $F^3$ is pressed backward slightly in order to enable the front face L to pass beneath the undercut portion M, and then released, whereupon the spring forces such front face into engagement. In this condition there is no tendency for the lock to tilt back and release the engagement of the parts. The rim sections may shift slightly until the parts $F^2$ and $F^3$ abut, whereupon any further movement is prevented.

In the construction shown in Fig. 5 the hook $C^2$ is provided with an undercut rear face while the abutment $D^2$ is also undercut, together with the front end of the hook $C^3$. The lock in this case comprises a flat plate $F^5$ which is slightly tapered and the edges of which are also slightly beveled. The lock is forced between the abutments $D^2$ and the hook $C^2$ by a slight tap of the hammer or other tool, thus wedging the parts in position.

Although we have shown in detail several embodiments of our invention, we do not wish to be limited thereto as various changes may be made therein without departing from the invention.

The lock F in Figs. 1 and 2 may be beveled and engage undercut edges in the buttons and hooks if desired, as illustrated in Fig. 1.

What we claim is:—

1. A demountable rim for tires, comprising two sections having a series of hooks and lugs adapted to be engaged by a relative rotary movement of said sections and a lock adapted to be inserted between said hooks and lugs for preventing reverse movement of said sections, said lock being pivoted to one of said sections and adapted to swing out of line with both said lugs and hooks, whereby said hooks can enter the space between said lugs without obstruction by said lock.

2. A demountable rim for tires comprising two sections adapted to be united, one of said sections having a series of hooks and the other a series of lugs, a lock attached to one of said sections and adapted to fit between one of said hooks and one of said lugs, one of said parts having an undercut portion and said lock having a beveled edge adapted to engage such undercut portion.

3. A demountable rim for tires comprising two rim sections adapted to be united, one of said sections having a series of hooks and the other a series of lugs, and a lock pivoted to one of said sections out of line with said interengaging means and adapted to lie flat upon said sections and to engage one of said hooks and one of said lugs.

4. A demountable rim for tires comprising two rim sections adapted to be united, said sections having interengaging portions adapted to be united by a relative rotative movement, and a spring lock attached to one of said sections and adapted to engage said interengaging portions to prevent separation of said sections.

5. A demountable rim for tires, comprising two sections having a series of hooks and lugs adapted to be engaged by a relative rotary movement of said sections and a lock adapted to be inserted between said hooks and lugs for preventing reverse movement of said sections, said lock having a spring shank pivoted to one of said sections, said lock being adapted to swing out of line with both said lugs and hooks, whereby said hooks can enter the space between said lugs without obstruction by said lock.

6. A demountable rim for tires comprising two sections adapted to be united and a lock comprising a plate lying flat-wise along the inner face of the rim and adapted to be interposed between interengaging portions of the two sections, said lock having a spring shank, and said shank being pivoted to one of said sections.

In witness whereof, we have hereunto signed our names in the presence of two subscribing witnesses.

HENRY P. KRAFT.
PHILIP W. KAUTZMAN.

Witnesses:
EUGENE V. MYERS,
THOMAS F. WALLACE.